United States Patent [19]
Zander et al.

[11] 3,736,992
[45] June 5, 1973

[54] CONTROL COLLAR AND BEARING SUPPORT FOR POWER TOOL SHAFT

[75] Inventors: Richard L. Zander, Reisterstown; Erich Ostwald, Baltimore, both of Md.; Daniel H. Sides, New Freedom, Pa.

[73] Assignee: The Black and Decker Manufacturing Company, Towson, Md.

[22] Filed: July 14, 1971

[21] Appl. No.: 162,417

[52] U.S. Cl. .................. 173/48, 173/104, 308/103
[51] Int. Cl. ............................................. E02d 7/02
[58] Field of Search .................. 173/47, 48, 104; 308/103

[56] References Cited

UNITED STATES PATENTS

| | | | |
|---|---|---|---|
| 618,131 | 1/1899 | Parker et al. | 308/103 |
| 3,000,225 | 9/1961 | Taylor | 173/48 |
| 3,119,274 | 1/1964 | Short | 173/48 |
| 3,145,782 | 8/1964 | De Bruin | 173/48 |

*Primary Examiner*—James A. Leppink
*Attorney*—Leonard Bloom, Joseph R. Slotnik and Edward D. Murphy

[57] ABSTRACT

A portable electric tool having a motor supported within a housing and adapted to rotate an output shaft. A toothed, hammer member is fixed to the output shaft and, when engaged with a stationary toothed member, imparts longitudinal impact blows to the output shaft during rotation thereof. An adjustable collar supports the shaft in the tool housing and is operable, in one position of adjustment, to allow the toothed members to engage, and in another adjusted position, to prevent the toothed members from engaging. The collar embodies a novel, simplified construction and is frictionally retained in position during use of the tool. In addition, a novel bearing arrangement is provided between the collar and the shaft to insure proper lubrication of the shaft during use of the tool.

7 Claims, 4 Drawing Figures

Patented June 5, 1973
3,736,992
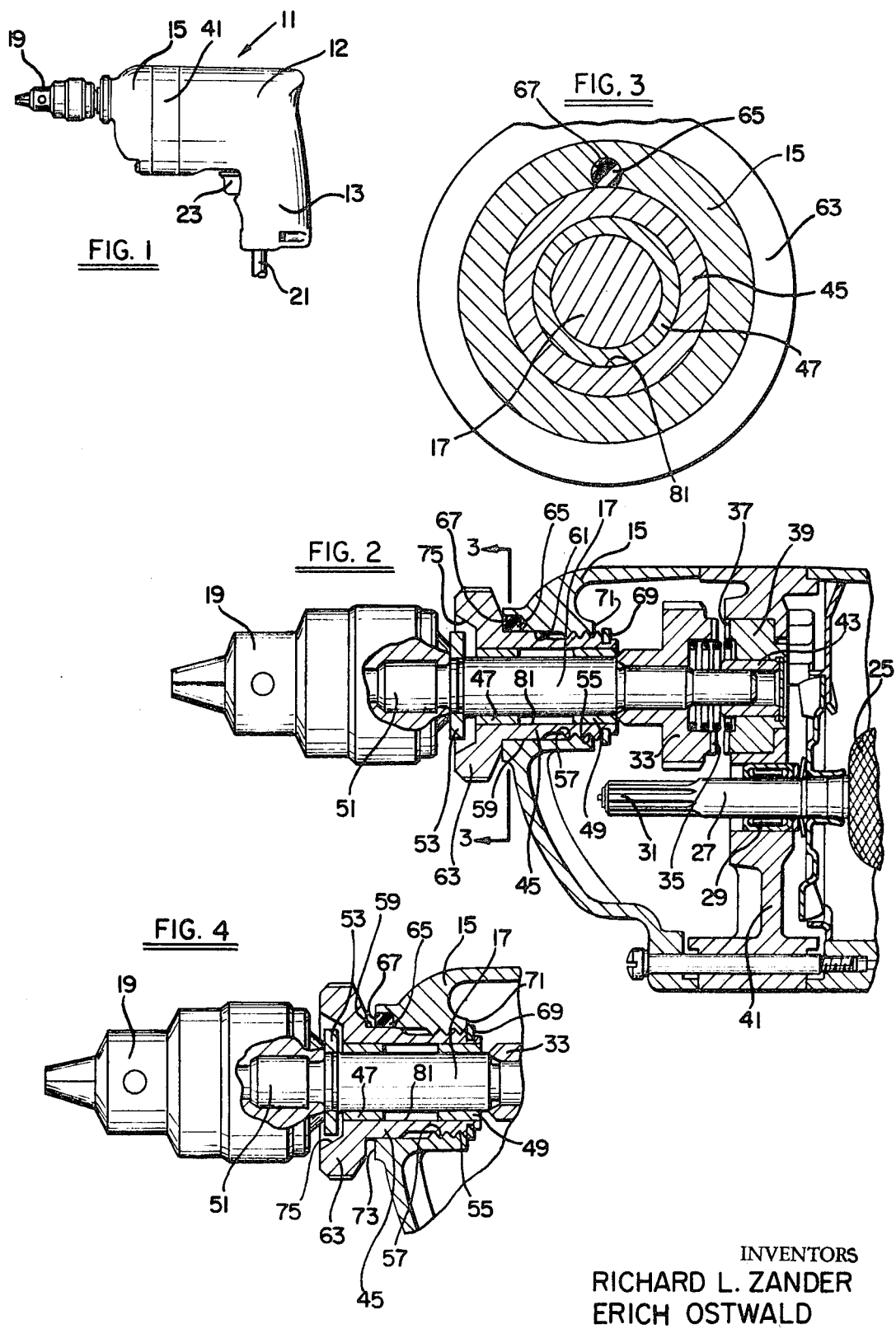
INVENTORS
RICHARD L. ZANDER
ERICH OSTWALD
DANIEL H. SIDES
BY
ATTORNEY

CONTROL COLLAR AND BEARING SUPPORT FOR POWER TOOL SHAFT

SUMMARY OF THE INVENTION

The present invention is directed to a novel assembly including a control collar and bearing support for a driven shaft adapted to undergo, for example, rotation or rotation plus axial movement, such as, for example, the output shaft of a hammer drill. The control collar of this invention is greatly simplified in construction and yet provides for long life and efficiency in use, and is accurate and reliable in operation. A novel bearing assembly supports the driven shaft within the collar and serves to insure proper lubrication of the shaft during operation.

Main objects of the present invention, therefore, are to provide a novel collar and bearing support for a driven rotary and/or reciprocable shaft, which assembly includes a minimum of parts, and enhances long life through efficient lubrication thereof.

Further important objects of the present invention are to provide a novel collar and bearing support of the above character which finds particular use in a power tool, such as, for control and support of the output shaft of a hammer drill, wherein the collar is manually adjustable to alter the characteristics of the output shaft and is securely retained in the various adjusted positions, and wherein the bearing support overcomes loss of lubricant particularly attendant during shaft reciprocation.

Additional important objects are to provide a novel collar and bearing assembly of the above character which is relatively inexpensive to manufacture, rugged in construction, and reliable and efficient in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a portable, electric hammer drill embodying the present invention;

FIG. 2 is an enlarged vertical sectional view illustrating a portion of FIG. 1 and showing the parts in position for "hammer drilling;"

FIG. 3 is an enlarged sectional view of FIG. 2, taken along the lines 3—3 thereof; and FIG. 4 is a view similar to FIG. 2 and showing the parts in position for "drilling."

BROAD STATEMENT OF THE INVENTION

Broadly described, the present invention relates to a hammer drill comprising a housing having an electric motor therein, an output shaft rotatably and reciprocably disposed within said housing and extending outwardly thereof and rotatably driven by said motor, cooperable means secured to said shaft and said housing, respectively, and engageable to impart longitudinal reciprocation to said shaft during rotation thereof, a collar adjustably supported upon said housing and movable from a first position, where said cooperable means is prevented from engagement, to a second position where said cooperative means is engageable upon application of axial force to said shaft, said collar comprising a one-piece member threadedly received in said housing and having an external flange for manually turning said collar.

In another aspect, the present invention relates to a portable, electric tool including a housing having a motor supported therein, an output shaft extending outwardly of said housing and rotatably driven by said motor, means within said housing for imparting longitudinal reciprocation to said shaft, said supporting means for said shaft comprising a collar having a through bore, first and second axially spaced bearings disposed within said bore, said bearings receiving and supporting said shaft, said spaced bearings, said collar, and said shaft defining a lubricant reservoir for said shaft.

In still another aspect, the present invention relates to an assembly including a control collar and bearing support for a rotating and selectively reciprocating shaft, said assembly comprising a collar threadedly received within a housing, compressible means confined by one and directly frictionally engaging the other of said housing and said collar at a smooth surface thereof, first and second bearings supported within said collar and supportably receiving said rotating and selectively reciprocating shaft, said bearings being axially spaced and forming a lubricant reservoir with said collar and said shaft, said collar having a radial flange externally of said housing and adapted for manual grasping, whereby to adjustably thread said collar relative to said housing.

DETAILED DESCRIPTION

Referring now more specifically to the drawings, a portable, electric tool, embodying the present invention, is illustrated generally at 11 in FIG. 1, and is seen to include an integral motor housing 12 and handle 13 having a gear case 15 secured thereto. The tool 11 includes an output shaft 17 extending forwardly of the gear case 15 and having a tool chuck 19 fixed thereto. The handle 13 has a dependent line cord 21 which interconnects the tool 11 with an electric power source, and a trigger 23 on the handle 13 controls on-off operation of the tool 11.

As shown in FIG. 2, an electric motor 25 is supported within the motor housing 12 and has an armature shaft 27 extending into the gear case 15 and supported by a bearing 29. The shaft 27 has a pinion 31 formed on its end and drivingly engaging a gear train including a gear 33 through one or more intermediate gears (not shown), gear 33 being fixed to the shaft 17. Thus, when the tool 11 is turned "on," the motor 25 rotates the shaft 17 and the chuck 19.

It may be desirable to impart longitudinal hammer blows to the output shaft 17 and chuck 19 (and to a bit held by the chuck) in addition to rotation thereof. To this end, the gear 33 has ratchet-like teeth 35 formed on its rearward face in confronting relation to complementary ratchet teeth 37 formed on the front face of the stationary hammer block 39 fixed to a gear case cover 41. The ratchet teeth 35, 37 are normally held in spaced relation by a compression spring 43 caged between the gear 33 and the hammer block 39. However, under certain conditions, as described below, axial force on the shaft 17, as when a tool bit held by the chuck 19 is pressed against a work surface, causes the shaft 17 to move rearwardly, or in a right hand direction, as seen in FIG. 2, causing the ratchet teeth 35, 37 to engage. Continued rotation of the shaft 17 causes the teeth 35 to ride or "ratchet" over the teeth 37 thereby imparting longitudinal impact blows to the shaft 17 and chuck 19.

As shown in FIG. 2, the shaft is supported at its inner or right hand end by a bearing 43 carried by the stationary hammer block 39. The forward or left hand end of the output shaft 17 extends through a collar 45 carried by the gear case 15 and is rotatably supported therein by a pair of axially spaced bearings 47, 49. The terminal end 51 of the shaft 17 is threaded into or otherwise fixed to the chuck 19, and the latter seats against a washer 53 on the shaft 17.

As shown in FIG. 2, the collar 45 is provided with external screw threads 55 adjacent its inner end and which screw threads cooperatively interengage with internal screw threads 57 formed in the gear case 15. The collar 45 also has a smooth, annular portion 59 cooperatively receivable in a smooth annular bore 61 also formed in the gear case 15. Furthermore, the collar 45 has an enlarged, knurled outer flange 63 which is manually movable for turning the collar 45. Thus, the collar 45 may readily be turned to adjust its axial position relative to the gear case 15. A nylon pellet 65 is disposed within a recess 67 formed in the front of the gear case 15 and engages the smooth annular surface 59 on the collar 45 to frictionally retain the collar in adjusted positions. The inner end of the collar 45 is provided with a retaining ring 69 engageable with a shoulder 71 on the gear case 15 to limit axial left hand movement of the collar 45, while engagement between the enlarged, knurled flange 63 and the front face 73 on the gear case limits axial right hand movement of the collar 45.

The washer 53 on the shaft 17 is located in the counterbore 75 formed in the front or left end of the collar flange 63 and limits axial inward movement of the shaft 17. Thus, when a bit located in the chuck 19 is pressed against a work surface, the chuck 19 and the shaft 17 move axially inward of the gear case 15, or in a right hand direction as seen in FIG. 2, until the washer 53 seats in the bottom of the counterbore 75. However, when the collar 45 is located in the axial inward position, shown in FIG. 2, the shaft 17 can move sufficiently to bring the ratchet teeth 35, 37 into engagement. In this position of the parts, the tool 11 is set for "hammer drilling". In other words, energization of the motor 25 causes the shaft 17 and chuck 19 to rotate and to undergo limited axial reciprocation as the result of the ratcheting action of the teeth 35, 37. However, when the collar 45 is located in its axial outward position, shown in FIG. 4, axial movement of the shaft 17 is limited to the extent that the ratchet teeth 35, 37 cannot engage. In this position of the parts, the tool 11 functions as a drill wherein the shaft 17 and chuck 19 rotate only.

An important feature of the present invention resides in the spaced arrangement of the bearings 47, 49 for the shaft 17. It will be appreciated that as a result of the limited axial reciprocation to which the shaft 17 is subjected during hammer drilling, there is a tendency for lubricant to move with the shaft and for some lubricant to leak out the front end of the gear case 15. This tendency increases, of course, as the bearings for the shaft and the shaft itself become worn with use. In the present invention, a lubricant reservoir is formed between the bearings 47, 49, the collar 45, and the shaft 17, so that lubricant from within the gear case 15 which seeps past the bearing 49 is trapped in this reservoir 81. This not only helps to insure that the shaft 17 is efficiently lubricated throughout that part of its length normally subjected to wear, but also, the pressure within the reservoir 81 is sufficiently low so that there is little or no tendency for the lubricant therein to be pushed past the bearing 47. Thus, the lubricating capabilities are greatly enhanced and wear of the parts is greatly reduced.

Another feature of the invention resides in the fact that the pellet 65 which frictionally retains the collar 45 in selected adjusted positions, that is, for drilling or hammer drilling, engages a smooth annular surface 59 on the collar 45, rather than the screw threads 55. This insures that the pellet 65 will have a relatively long life and eliminates the need for any adjustment means to take up wear in the pellet during use of the tool.

Furthermore, it will be appreciated that the collar 45 in the present invention is of one-piece construction having only a separate retainer ring 69 to hold it in place within the gear case 15. This is distinguished from many of the prior art devices which utilized several expensive and separately made parts.

It will also be appreciated that the features of the present invention have application and use beyond the specific detailed environment illustrated herein and described above. Thus, the bearing-reservoir arrangement will find use in the broad field of axially movable shafts, whereas the control collar illustrated herein and described above finds use in, for example, drill-screwdriver tools wherein the output shaft is positively coupled for rotation with a motor driven shaft or is selectively engageable with a torque-releasable clutch. Furthermore, it will be appreciated that other modifications, substitutions, omissions and variations may be made to the present invention without departing from the spirit of the invention.

We claim:

1. A hammer drill comprising a housing having an electric motor therein, an output shaft rotatably and reciprocably disposed within said housing and extending outwardly thereof and rotatably driven by said motor, cooperable means secured to said shaft and said housing, respectively, and engageable to impart longitudinal reciprocation to said shaft during rotation thereof, a collar adjustably supported upon said housing and movable from a first position, where said cooperable means is prevented from engagement, to a second position where said cooperative means is engageable upon application of axial force to said shaft, said collar comprising a one-piece member threadedly received in said housing and having an external flange for manually turning said collar.

2. A device as defined in claim 1 wherein said collar has a smooth cylindrical portion received in said housing, and compressible friction means on said housing engaging said cylindrical portion.

3. A device as defined in claim 1 wherein said shaft has shoulder means cooperatively engageable with shoulder means on said collar, resilient means normally separating said cooperable means, said shoulder means being engageable before engagement of said cooperable means upon axial movement of said shaft when said collar is in said first position.

4. A device as defined in claim 1 wherein said shaft extends through said collar, and axially spaced bearings in said collar and defining a lubricant reservoir with said collar and said shaft.

5. A portable, electric tool including a housing having a motor supported therein, an output shaft extending outwardly of said housing and rotatably driven by said motor, means within said housing for imparting longitudinal reciprocation to said shaft, said supporting means from said shaft comprising a collar having a through bore, first and second axially spaced bearings disposed within said bore, said bearings receiving and supporting said shaft, said spaced bearings, said collar, and said shaft defining a lubricant reservoir for said shaft.

6. An assembly including a control collar and bearing support for a rotating and selectively reciprocating shaft, said assembly comprising a collar threadedly received within a housing, compressible means confined by one and directly frictionally engaging the other of said housing and said collar at a smooth surface thereof, first and second bearings supported within said collar and supportably receiving said rotating and selectively reciprocating shaft, said bearings being axially spaced and forming a lubricant reservoir with said collar and said shaft, said collar having a radial flange externally of said housing and adapted for manual grasping, whereby to adjustably thread said collar relative to said housing.

7. An assembly as defined in claim 6 wherein said compressible means includes a resilient pellet carried in a recess in said housing and directly engaging a smooth annular surface on said collar.

* * * * *